United States Patent Office 2,734,008
Patented Feb. 7, 1956

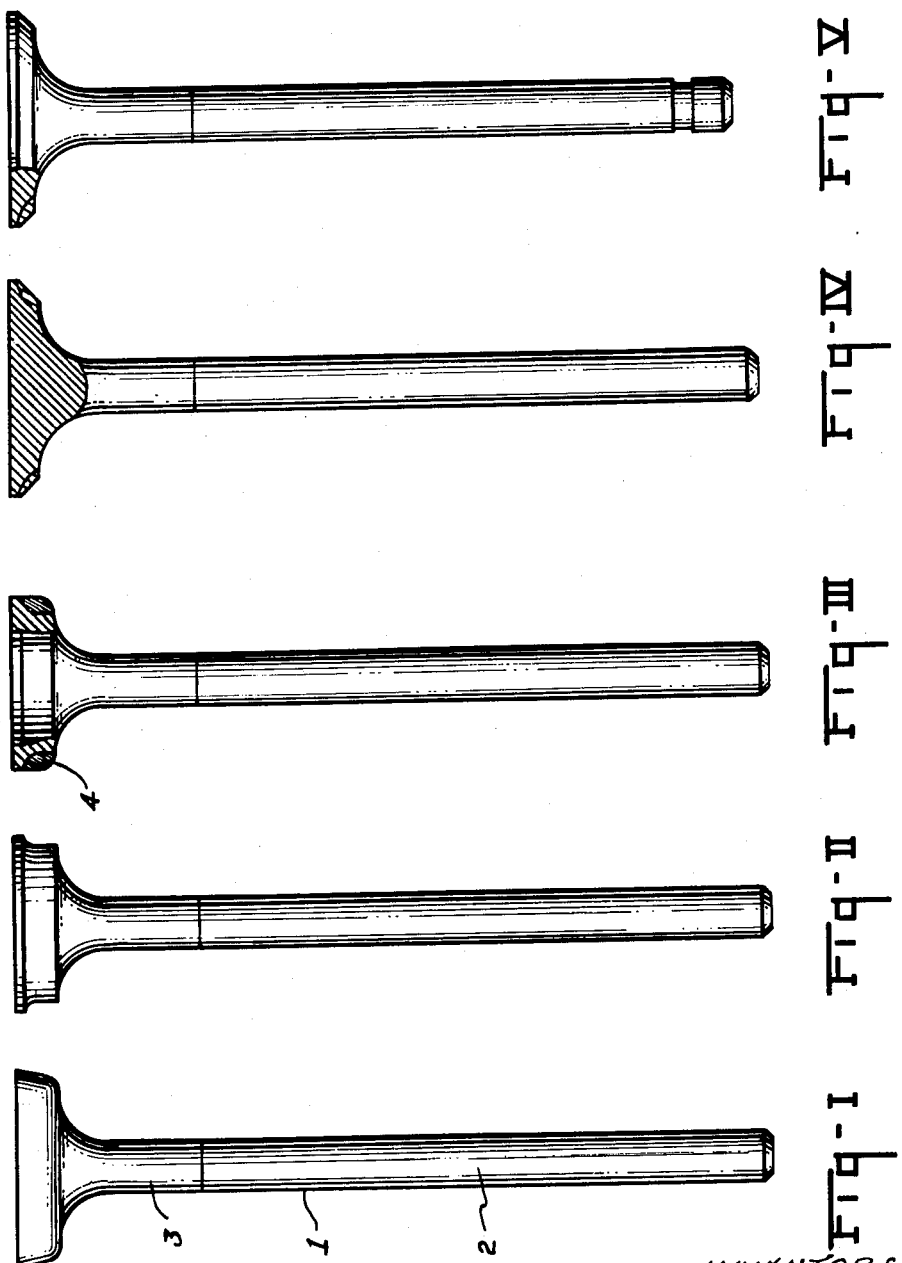

2,734,008

METHOD OF MAKING HEAT TREATING AND HARDENING VALVES

Leland W. Kirkpatrick and Robert J. Gibson, Battle Creek, Mich., and George R. Rich, deceased, late of Battle Creek, Mich., by Dora M. Rich, executrix, Battle Creek, Mich., assignors to Rich Manufacturing Corporation, Battle Creek, Mich., a corporation of Michigan Original application February 28, 1949, Serial No. 78,814. Divided and this application July 14, 1952, Serial No. 298,784

5 Claims. (Cl. 148—11.5)

The present invention relates broadly to valves of the poppet type, and in its specific phases to a special form of valve having a welded in place forgeable corrosion resistant seat and the method of forming such valve.

During the past few years many changes have been made in the construction of internal combustion engines, as well as the fuel used in such engines. Some of these changes, which are for greater efficiency, involve matters such as higher compression, higher speeds, and the use of higher octane fuels, and these in turn have produced much more severe operating conditions on all parts of the engines. Valves are one of the most important parts of internal combustion engines, and present day engines of that type, in their development, are experiencing considerable valve trouble, and that trouble has been retarding the advancement of new engine designs until such time as a valve is produced which is able to withstand the extreme service involved. There are several problems involved in meeting these conditions, and one is that the hot products of combustion, hot acids in same, and the hot lead products resulting from the use of tetra-ethyl-lead in the gasoline, attack the valve head and valve seat to cause premature failure. One proposed attempt to meet this has involved the brazing of a thin sheath of nickel-chromium alloy over the head and seat of the valve, and in that construction the under edge of same is welded in place, with either the brazing, welding, or both being done after the valve is completed except for a finish grinding operation. This thin sheath, if same can be satisfactorily brazed and welded to the valve head, will help protect the valve head from the hot gases, acids, and lead, but will have a soft seat, due to the brazing and/or welding steps, which will not stand the rigid operating conditions now coming into being. Facing the valve seat with a hard material such as Stellite, which is brittle and cannot be forged, has been quite commonly resorted to even though it is expensive to install and finish, and there is a high loss of finished valves at inspection (and during the making of repairs) due to cracks and gas holes in the face of the Stellite seat. It was a recognition of this difficult problem and the knowledge that there had been no wholly satisfactory solution to it which led to the conception and development of the present invention.

Accordingly among the objects of the present invention is the provision of a valve construction wherein the valve head is provided with a forgeable, hardened, and hot gas, acid, and lead resistant seating face of highly corrosion resistant alloy metal.

Another object is to provide a valve with a highly corrosion resistant alloy seat portion which is directly welded to the valve head so that they become an integral part of the finished valve.

Another object is to provide a new method of forming a poppet valve having improved properties enabling it to withstand more severe usage than has been previously required.

Another object is to provide a new poppet valve construction wherein an 80% nickel-20% chrominum alloy is directly added to the valve seat portion of a specially prepared alloy steel valve blank by welding, and then the head of that valve blank machined in predetermined amount to provide a clean metal face following which the head is coin pressed at suitable temperatures and pressures to bring the head to finished size except for light machining to produce the final dimensions of the finished valve.

A further object is to provide a long life, and relatively low cost, poppet valve having a hardened but self healing seating face which will adjust itself to minor inaccuracies in its face as well as minor variations in the block seat of the engine.

Still further objects and advantages of the present invention will appear as the description proceeds.

To the accomplishment of the foregoing and related ends, the invention, then, consists of the method steps and means hereinafter fully described and particularly pointed out in the claims, the annexed drawing, and the following description setting forth in detail certain means and modes of carrying out the invention, such disclosed means and modes illustrating, however, but several of the various ways in which the principle of the invention may be used.

In the annexed drawing:

Figure 1 shows a side elevation of a preferred form of the valve forging with the stem and head machined to form the blank from which the improved valve of the present invention is produced.

Figure 2 shows a side elevation of the Figure 1 construction after the sides of the valve head have been profiled to the desired contour.

Figure 3 shows a partially sectioned side elevation of the Figure 2 construction after the alloy metal, which is highly resistant to corrosion from exhaust gases, has been welded into the contoured area, and machined to produce a blank of close tolerances having a clean metal face.

Figure 4 shows a partially sectioned elevation of the valve blank of Figure 3 after the head of same has been coined.

Figure 5 shows a partially sectioned elevation of a preferred form of the valve of Figure 4 after same has been finish machined.

Referring more particularly to Figure 1, the forging of the valve 1 may be produced by any generally accepted procedure and same may be of one or two piece construction, solid, or hollow, in accordance with the type of valve to be produced. For simplicity of explaining the principles of the invention, same will be described in terms of a two piece solid valve, although it is not intended that the invention is to be limited to that construction and the drawing is to be considered as diagrammatic of the various forms of the invention embodying the principles to be explained herein.

The valve of Figure 1 is conventionally shown with the stem portion 2 of any steel having suitable properties for this purpose, and on the upper end of same is welded a head portion 3 of a corrosion resistant alloy steel which is preferably of the high chromium-nickel type. A preferred form of this steel for use in the present invention has approximately the following composition:

| | |
|---|---|
| Carbon | .15– .25 |
| Manganese | .90– 1.30 |
| Silicon | .70– 1.00 |
| Nitrogen | .15– .25 |
| Chromium | 20.00–22.00 |
| Nickel | 10.00–12.00 |
| Iron | Balance |

The blank for the valve of the present invention may be produced in accordance with any generally accepted forging procedure with reasonably close limits held on all dimensions. The forging as thus made is then treated to remove any scale following which the stem is ground to diameter and the head is then turned to form the blank shown in Figure 1 of the drawing. This head is next profiled as shown in Figure 2 to prepare it for the welding step which follows. This profiling exposes fresh clean metal which is ideal for use as a weldable surface, although if desired this profile could be formed at the time of making the original forging and the desired clean surface obtained by suitable scale removing procedure.

With the valve blank in the form shown in Figure 2, it is ready to have the profiled portion filled in with an alloy metal 4 which is highly resistant to heat and corrosion from exhaust gases. The metal which we prefer for this purpose is commonly known as an 80–20 nickel-chromium alloy. A typical analysis of this metal is as follows:

| | |
|---|---|
| Chromium | 19.00–21.00 |
| Carbon | .15–.30 |
| Manganese | .60–1.00 |
| Silicon | .30 Max. |
| Iron | 1.00 Max. |
| Sulphur | .03 Max. |
| Nickel | Balance |

The chromium of this alloy can be varied over a range of approximately 10% in either direction and the nickel likewise about 3% and still be exceptionally satisfactory for use in the valves of the present invention.

The welding of the 80–20 alloy onto the valve head blank in the profiled area involves first preheating the blank to approximately 1200° F. The blank is then heated with a torch, preferably using oxy-acetylene gas, until it just reaches a temperature where it will fuse with the 80–20 alloy which has a melting point of approximately 2552° F., which is a little less than the melting point of the high chromium-nickel alloy used in the valve head. The 80–20 alloy is simultaneously heated with the torch and applied in molten form which allows any gas present to rise to the surface of the weld during the fusing step while avoiding stirring the head metal into the 80–20. This produces a unit weld between the 80–20 and the valve head in the profiled area with the 80–20 alloy in compact condition and substantially uncontaminated form. After the valve has cooled, its head is machined to produce the blank shown in Figure 3 where the welded area has a clean metal face ready for coining.

The preliminarily machined valve forging of Figure 3 is then heated to a temperature of approximately 1800° to 1900° F., and coin pressed under high pressure to refine both the welded metal 4 of the valve seat and the metal of the head portion 3 so as to produce the blank shown in Figure 4 wherein the 80–20 is moderately thick and commonly varies from 1/32" to 1/16" in thickness. The 80–20 valve seat metal 4 before coining has an average Rockwell "C" hardness of approximately C–10 to C–15 and after coining this hardness is increased to a relatively uniform resultant hardness of C–25 to C–28 in which condition it has a fine and close grain structure which is self healing and will adjust itself to minor variations in the block seat (not shown). This coining results in the valve seat alloy metal covering a large portion of the margin of the valve head where it protects this surface and prevents burning and scaling under conditions of operation.

The high chromium-nickel steel head 3 of the valve, before the coining stage, has a Rockwell "C" hardness of approximately C–20 to C–22 while this same valve head after coining has a hardness of approximately C–27 to C–29, which shows that the austenitic steel of the valve head has been considerably refined during the coining procedure. The relatively cold dies and the relatively small size of the valve blank quickly causes the temperature of the valve to be cooled considerably below the starting coining temperature and thus the increased hardness and refining attained by the coining procedures is held in the coined valve assembly.

In actual use in an internal combustion engine the seating edge of valve heads runs about 1300° F., maximum, although this may raise perhaps 50° F., higher under higher compression and raised octane ratings of gasoline to be used in advanced design engines. These temperatures are considerably below that at which the valve can be heated without substantial reduction in hardness of the 80–20 valve seat which has been obtained due to the coin pressing procedure.

After the valve has been formed as shown in Figure 4 it is then machined to given dimensions in order to produce a finished valve, one type of which is shown in Figure 5.

The present application is a division of copending application Ser. No. 78,814, filed February 28, 1949, now abandoned for "Valve and Method of Making Same."

Other modes of applying the principle of our invention may be employed instead of those explained, change being made as regards the means and the method steps herein disclosed, provided those stated by any of the following claims or their equivalent be employed.

We therefore particularly point out and distinctly claim as our invention:

1. The method of forming a poppet valve having a forgeable corrosion resistant seat, which comprises forming a valve blank having a head of suitable alloy steel, said valve head having at its lower edge a relatively uniform diameter undercut edge portion, fusing a suitable somewhat lower melting point forgeable and corrosion resistant molten metal to said edge portion of the valve, said fused metal being a nickel-chromium alloy wherein the chromium is present in an amount approximating 19 to 21 per cent and the balance of said alloy is substantially nickel, machining the face of said fused metal to a surface size, heating said valve to a relatively high temperature substantially below the fusing temperature of said nickel-chromium alloy, and coining the head portion of said valve to predetermined size and shape while simultaneously cooling same, whereby, in finished form, said fused metal portion becomes the valve seat and is refined and hardened.

2. In the method of forming a poppet valve having substantially an 80–20 nickel-chromium alloy seat, the steps which comprise heating said valve to a temperature in the range of approximately 1800° to 1900° F., and then simultaneously coin pressing and cooling said valve head and seat to refine and harden same.

3. In the method of forming a poppet valve having substantially an 80–20 nickel-chromium alloy seat, the steps which comprise heating said valve to a temperature of approximately 1800° to 1900° F., coin pressing said valve head and seat until said 80–20 alloy seat has a resultant Rockwell hardness of approximately C–25 to C–28, and then finish machining said valve.

4. In the method of forming a poppet valve having a high chrome-nickel alloy steel head with an 80–20 nickel-chromium alloy seat, the steps which comprise applying said 80–20 alloy in molten condition and fusing same in place on said valve head, heating said valve to a temperature of approximately 1800° to 1900° F., coin pressing and cooling said valve head and seat until said head has a Rockwell hardness of approximately C–27 to C–29 and said 80–20 alloy has a hardness of approximately C–25 to C–28 before releasing the coin pressing pressure, and then finish machining said valve.

5. The method of making a poppet valve having a forgeable corrosion resistant seat, which comprises preforming to suitable size and shape a valve blank having a head of suitable alloy steel, said valve head having a relatively uniform diameter reduced size edge portion, applying an 80–20 nickel-chromium alloy in molten condition to said valve head in said edge portion and fusing same together while maintaining the major portion of said fused-on 80–20 alloy substantially unmixed with said valve head metal, machining the face of said valve so as to form a blank of suitable size and shape for the particular valve to be made, heating said valve to a temperature in the range of approximately 1800° to 1900° F., coin pressing said valve head with its 80–20 alloy portion to predetermined size and shape with said 80–20 alloy portion becoming the valve seat, and cooling said valve before releasing said coining pressure, whereby said 80–20 alloy is refined and hardened.

UNITED STATES PATENTS

References Cited in the file of this patent

| | | |
|---|---|---|
| 1,438,597 | Jardine | Dec. 12, 1922 |
| 1,904,430 | Ferrando | Apr. 18, 1933 |
| 2,273,250 | Charlton | Feb. 17, 1942 |
| 2,513,939 | Hoern | July 4, 1950 |